INVENTORS.
JOHN J. FISCHER
ROBERT V KNOX

ATTORNEY

Sept. 8, 1964    J. J. FISCHER ETAL    3,147,626
INERTIAL SYSTEM ALINEMENT

Filed Dec. 11, 1958    6 Sheets-Sheet 4

INVENTORS.
JOHN J. FISCHER
ROBERT V. KNOX
BY Allan Rothenburg
ATTORNEY

United States Patent Office 3,147,626
Patented Sept. 8, 1964

3,147,626
INERTIAL SYSTEM ALINEMENT
John J. Fischer, Fullerton, and Robert V. Knox, Whittier, Calif., assignors to North American Aviation, Inc.
Filed Dec. 11, 1958, Ser. No. 780,183
22 Claims. (Cl. 74—5.4)

This invention relates to the orientation of inertial systems and more particularly to methods and apparatus for rapidly measuring or correcting initial error in orientation of such systems.

For navigation from one location to another it is necessary to know both distance and direction. Generally, a direction reference is carried by the vehicle to be navigated and the direction of travel is controlled with respect to such directional reference. Thus, it is necessary to know the orientation of the directional reference with respect to a selected external orientation.

Among the many types of directional reference instruments are inertial navigators which carry inertial instruments for measuring distances in known directions. An inertial navigator fundamentally comprises a set of accelerometers for measuring accelerations of the vehicle on which the system is carried along the sensing axes of the accelerometers. Thus, a first integration yields velocity and a second integration yields distance traveled in the direction of the sensing axes. The integration, or integrations, may be performed either internally or externally of the accelerometer. The term "accelerometer" as used herein is defined as including instruments having outputs indicative of either acceleration, velocity or distance (the latter two being commonly known as velocity meters and distance meters, respectively). In order to maintain the accelerometer axes in known directions, it is conventional to fixedly mount the instruments to a stable element which is gimballed for three degrees of angular freedom with respect to the carrying vehicle. A set of gyroscopes is provided to hold the stable element in an orientation fixed with respect to inertial space (as defined by the fixed stars, for example) or in a predetermined relation to inertial space such as rotating in synchronism with earth rotation, for example. The gimbal mounted assembly of accelerometers and gyroscopes is termed a stable platform. The orientation of the platform to which the accelerometers are fixed is, therefore, the directional reference provided by the inertial system.

Upon initial energization of the directional reference system, it is necessary to effect an initial alinement thereof. For the purposes of this discussion, the term "alinement" may be used to cover either the physical changing of orientation of the platform or the actual measurement of the deviation of orientation from an external reference.

Common methods of azimuth alinement include optical alinement, gyrocompass alinement and physical alinement. Optical alinement can be used to obtain accurate alinement in a reasonably short time provided that the vehicle containing the inertial system is placed such that a necessarily complex set of ground based optical equipment may be used to determine the alinement of the platform by means of a mirror mounted directly on the platform. The use of such equipment and the complications arising from the requirement of a direct line of sight to the inner element of the platform create obvious disadvantages.

Gyrocompass alinement, while eliminating certain disadvantages of optical alinement, is critically dependent for its accuracy upon the drift rate of the navigation gyroscopes of the platform. Since the method depends upon the detection of the earth's rotation with respect to the platform, considerable time is involved in development of a measured error angle which can be distinguished from random errors in the measuring equipment. Further, this method depends for its accuracy upon the magnitude of the horizontal earth rate component, a function of geographic latitude. Accuracy decreases with increase of latitude so as to provide at the earth's geographic poles entirely indeterminate results.

Physical alinement may be defined as any method in which the instantaneous or average orientation of the vehicle itself is used to aline or determine the alinement of the platform. The accuracy of such a method is poor since it depends upon the rigidity and accuracy of positioning of the vehicle structure itself and upon the accuracy of measurement of the orientation of the platform relative to the vehicle.

Accordingly, it is an object of this invention to achieve rapid and accurate alinement of a directional reference system independent of complex external equipment and of position on the earth's surface.

In accordance with several embodiments of the present invention the inertial system is moved from one location toward a second location which together define the orientation of an external control line. The motion of the platform is controlled in a manner such that a component of motion substantially in the direction of the external control line becomes relatively large at some time. The motion is also controlled such that the component of actual motion in a direction substantially normal to the direction of the external control line is held at or brought to zero. At the time when the normal component of motion is zeroed the normal motion component as measured by the accelerometers of the system is measured or computed. The accelerometer derived motion component in a direction normal to the external control line is then a direct indication of the misalinement of the platform. The term "motion component" or "integral function of acceleration" is herein defined as including acceleration and the first and second integrals thereof, velocity and distance, respectively. Thus, where the integral function of acceleration utilized is distance, for example, the accelerometer measured displacement in a direction substantially normal to the external control line is measured when the inertial system itself is substantially on the external control line (the normal displacement is zero).

In accordance with a particular embodiment of the invention, azimuth alinement of the platform may be accomplished during take-off of an aircraft to be navigated by the directional reference system. The platform is initially leveled and a reference line or at least an initial point and a calibraion or target point are provided on or adjacent the runway such that the vehicle may be moved on or close to the ground in such a manner that the motion with respect to the reference line or reference points may be actually measured by means external to the inertial system. This external measurement may be effected by any suitable means and, for example, may be achieved by the vehicle pilot himself who so controls the vehicle as to keep it exactly on the runway line or at least to cross the line at some appreciably distant point. When the vehicle has travelled an appreciable distance, such as one mile, for example, the azimuth bearing of the stable platform or inertial system is computed from the output signals of the accelerometers. To obtain a relatively high degree of accuracy with this method, it is necessary to known the initial values of the accelerometer outputs to a considerable degree of accuracy. Thus, a feasible application of the invention would be to, first, "cage" the system—i.e., hold position and velocity values of the inertial system output signals to zero—while the aircraft is stopped at the end of the runway ready to start its take-off run; second, release the inertial system from its held or "caged" condition just prior to initiation of the take-off run; and, third, measure the position components developed by the accelerometers over a selected distance of the take-off run, i.e., at some distance down the runway line or as the vehicle crosses or passes the second of the reference points.

Use of the accelerometers of the inertial system itself creates a problem by virtue of the mode of error propagation inherent in an inertial system. A discussion and analysis of such inherent errors may be found in an article entitled "Analysis of an Inertial Guidance System" by D. B. Duncan in Jet Propulsion, volume 28, No. 2, February 1958, page 111. Sources of error in such a system are of a dynamical nature. Position errors which typify inertial systems satisfy the equation of an undamped harmonic oscillator having a period of substantially eighty-four minutes, the "Schuler period." Errors are propagated in a cumulative manner and thus are built up relatively rapidly within the system period. Indicative of the mode of propagation of such errors is an error E in the measurement of alinement which is caused by the fact that the accelerometer derived measurements are in error due to the azimuth misalinement of the system. For example, for a period of time short compared to $$\frac{1}{2\pi} \times \text{Schuler period}$$

a component $E_1$ caused by errors in platform level is of the form $$E_1 = \frac{gt_a^2}{2S} \phi_D$$

where $g$ is the acceleration of gravity, $t_a$ is the time during which the measurement is made, $S$ is the distance travelled during the measurement and $\phi_D$ is the probable tilt of the platform. It can be seen that this particular error is a function of the square of the time during which the measurement is made. Other errors exist which are propagated quadratically or cubically with time and may considerably degrade the accuracy of measurement. The errors are, for the most part, however, propagated in a manner such that the errors themselves and the rate of build-up thereof are initially zero. Thus, it is desirable for accurate operation of a method utilizing the outputs of the accelerometers of the inertial system to keep the time of measurement as small as possible and, in any event, considerably less than $$\frac{1}{2\pi} \times \text{Schuler period}$$

Thus, it is contemplated in a particular application that the time during which the motion is measured be on the order of about 40–60 seconds and that the platform be moved during such time for a distance such as one mile, for example.

It is an object of this invention to achieve improved alinement of a directional reference system.

A further object of the invention is the use of an inertial system to aline itself relative to an external reference direction.

Still another object of the invention is to provide a method and apparatus for alinement of an inertial system through the use of its own inertial instruments independently of the errors inherently propagated in the system itself.

Another object is to provide a method and apparatus for achieving a rapid and accurate alinement of a direction reference during an initial portion of a traverse which is to be navigated under control of such reference.

Still another object of the invention is to provide a method and apparatus for rapid azimuth alinement of an inertial autonavigator during take-off of the vehicle which is to be navigated thereby.

These and other objects of this invention will become apparent from the following description taken in connection with the accompanying drawings, in which FIGS. 1a and 1b are graphical explanations of certain aspects of the invention;

Figure 5:
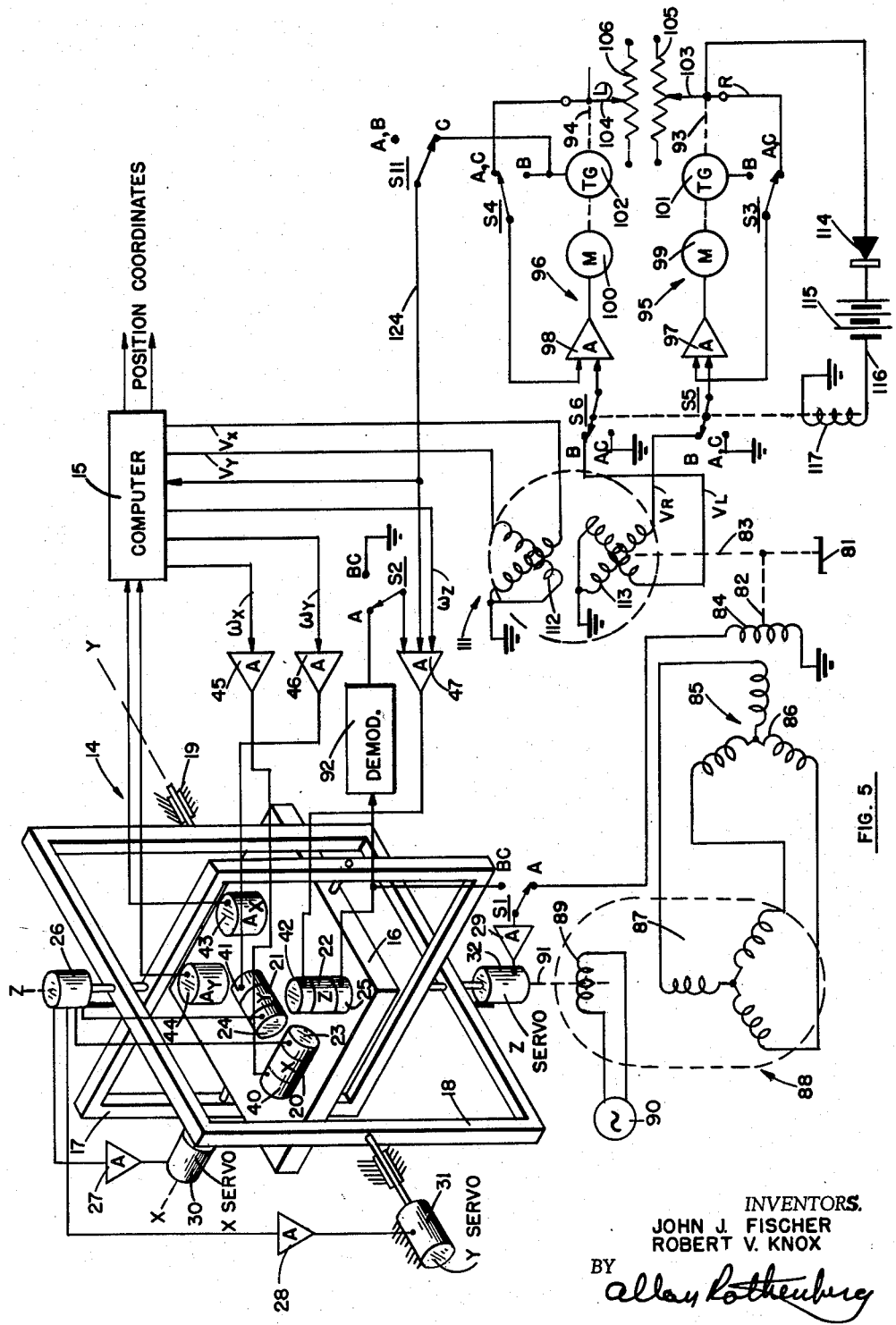
FIG. 5 shows certain details of still another embodiment of the invention.
Figure 6:
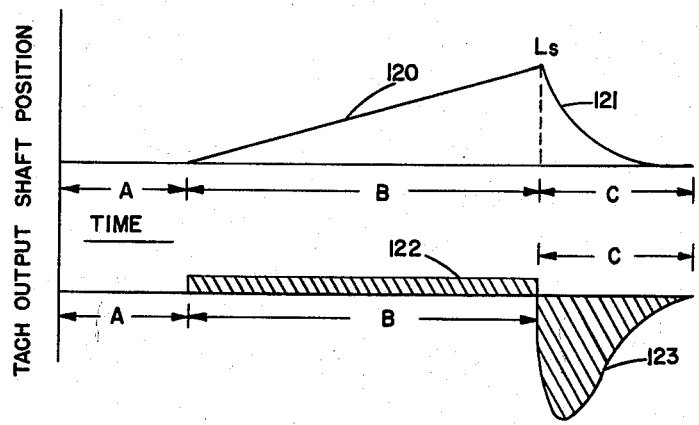
FIG. 6 is a graphical illustration of certain operations of the structure of FIG. 5.
Figure 8:
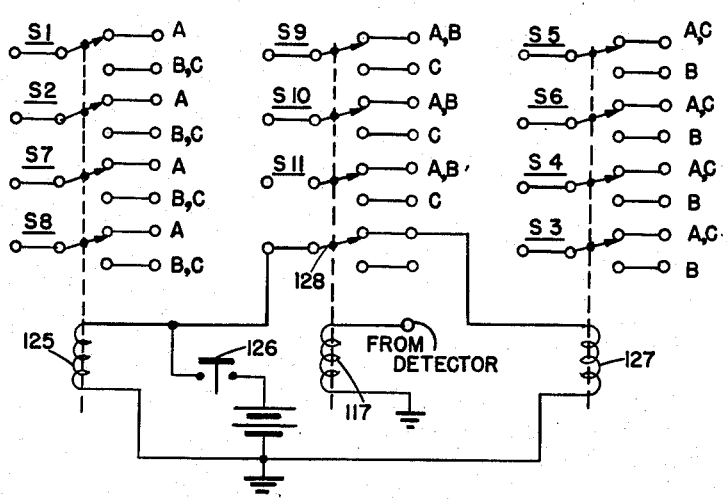
Figure 7:
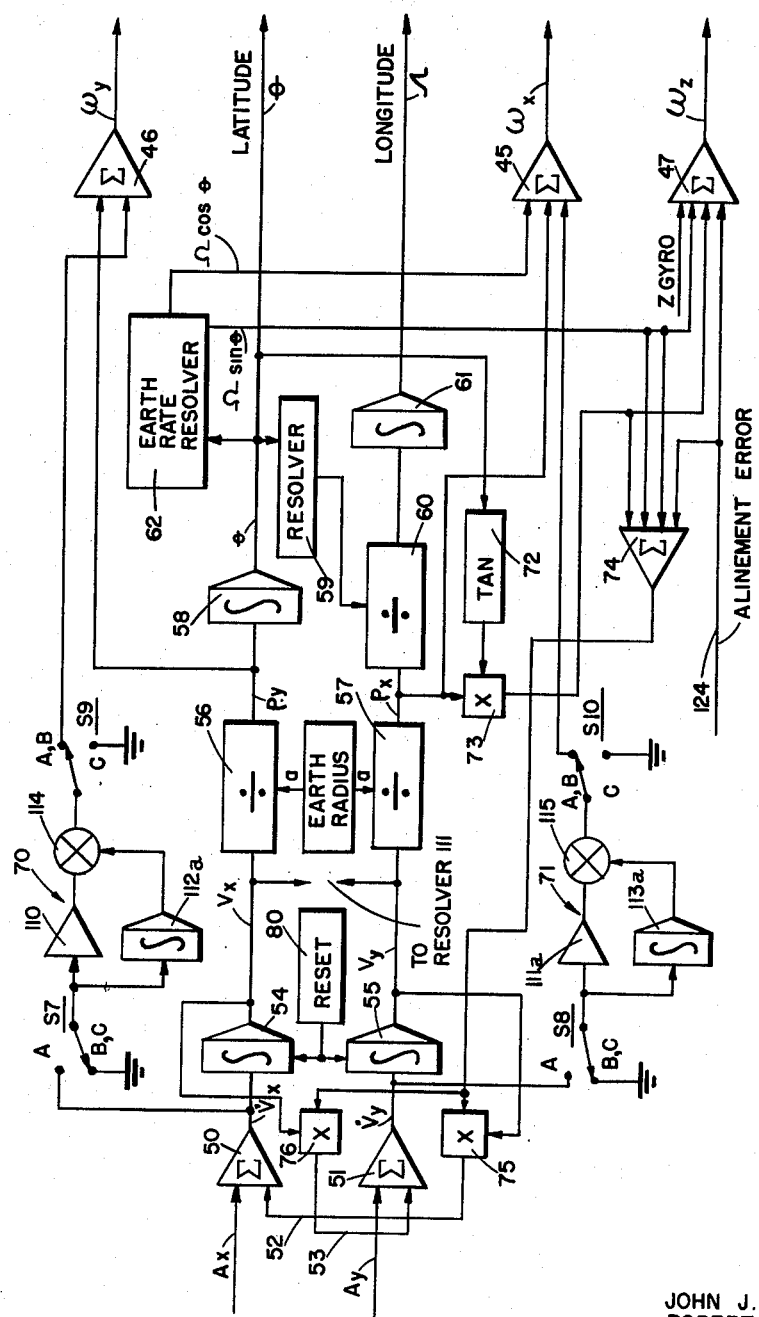
FIG. 7 illustrates details of an exemplary computer which may be used with the embodiment of FIG. 5.

And FIG. 8 illustrates an exemplary switching arrangement of the embodiment of FIGS. 5, 6 and 7.

In the drawings, like reference characters refer to like parts.

Figure 1A:
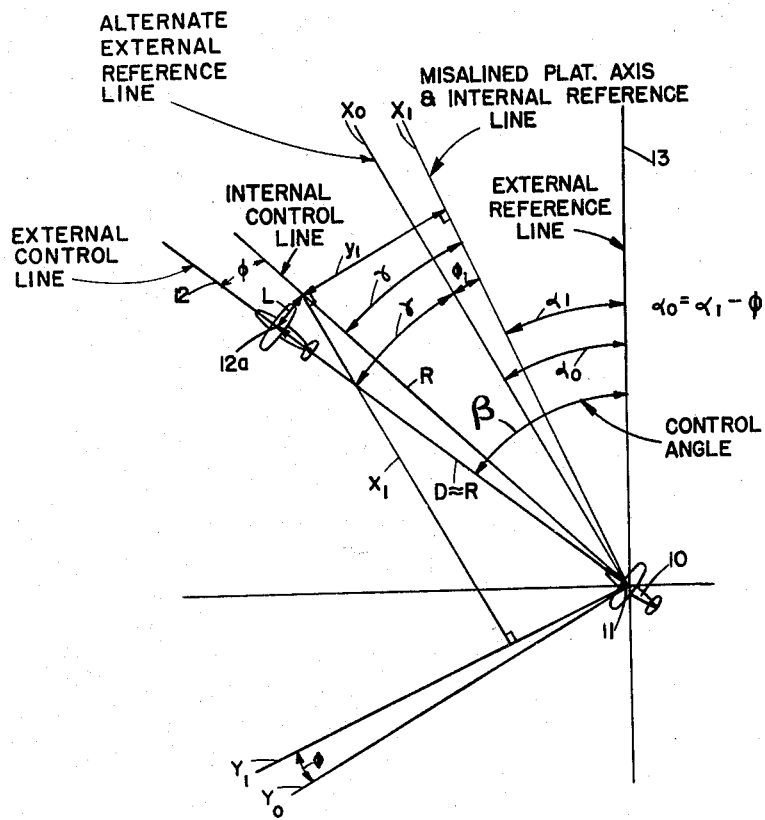

As illustrated in FIG. 1a, a vehicle such as an aircraft 10 which is to be navigated by an inertial system mounted therein is initially located at point 11 and physically alined in the direction of an external control line 12 which may be an accurately surveyed line on the runway or adjacent thereto. The azimuth bearing, $\beta$, of line 12 is accurately known with respect to an external reference line such as the true North line 13. The inertial system carried by the aircraft may contain a pair of mutually orthogonal accelerometers having sensing axes initially alined along the lines $X_1$ and $Y_1$ respectively. The accelerometers which are fixedly related to each other thus define or are held in a position which defines the internal reference line of the system. The reference line $X_1$ itself will be considered to be the internal reference line in the illustrative discussion of the present application, it being understood that other internal reference lines referenced to axes $X_1$ and $Y_1$ may be utilized. If the angle $\alpha_1$ between the sensing axis $X_1$ and the external reference line were known, the internal reference line would be accurately established. The angle $\alpha_0$ differs from $\alpha_1$ by $\phi$, the angle of misalinement. The angle $\alpha_0$ may be termed the wander angle which is maintained or stored in the computer of a system of the type wherein the platform is allowed to assume an arbitrary and varying orientation with respect to geographic North direction 13 as the vehicle travels. Because, in general, the actual angle $\alpha_1$ is not equal to the nominally correct angle $\alpha_0$, the system is initially misalined. In the special case where the sensing axis is to be alined in the direction of geographic North, the wander angle is, of course, zero.

The special case where the internal reference is to be geographic North is utilized in the ensuing description. The platform is initially physically alined in azimuth until the wander angle is zero. However, due to errors in this initial physical alinement the actual direction of the reference line $X_1$ is displaced from the desired direction thereof $X_0$ by the error angle $\phi$. Thus, it is a purpose of this invention to measure the error angle $\phi$ and either change the stored wander angle $\alpha_0$ by this amount or, alternatively, to physically shift the platform in azimuth to zero the error angle.

The platform is initially leveled and caged to a predetermined azimuth orientation such that the internal reference line is substantially alined with geographic North and the accelerometer outputs are zeroed while the aircraft 10 is at point 11. Immediately prior to initiation of the take-off run the platform is uncaged and the accelerometer outputs are released to thereby measure the respective distance components $x_1$ and $y_1$ as the aircraft travels from point 11 to point 12a along the line 12. If the line $X_0$ is the actual direction of geographic North, the direction of travel of the aircraft has an azimuth bearing indicated by the angle $\gamma$. The components $x_1$ and $y_1$ of the distances measured by the accelerometers are resolved through the angle $\gamma$ into components R and L which are substantially along the line 12 and normal thereto respectively. Actually the components L and R are normal to each other but for all practical purposes the lateral component L may be considered as normal to either the measured component R or the actual direction travelled 12 since the error angle $\phi$ is of small magnitude. The direction of the component R may be considered as an internal control line of the inertial system which is related to the external control line 12 by the error angle $\phi$. From the geometry of FIG. 1a it will be readily appreciated that knowning the measured components L and R the angle $\phi$ may be obtained in a number of ways.

Illustrated in FIG. 5 is a typical and substantially conventional and well-known type of inertial autonavigator comprising a stable platform 14 and a computer 15. The stable platform 14 includes a frame or support 16 pivoted about the X axis in an inner-gimbal 17 which is pivoted about the Z axis in an outer-gimbal 18. Gimbal 18 is pivoted about the Y axis to a fixed frame or support 19 which may comprise any suitable structural element of the vehicle itself or other structure rigidly affixed thereto. The axes X, Y and Z are mutually orthogonal. The frame 16 carries a set of conventional gyroscopes 20, 21 and 22 which may be single axis or single degree of freedom gyroscopes having the sensing or input axes thereof respectively alined along the X, Y and Z axes. The gyroscopes embody conventional pickoffs 23, 24 and 25 which provide signals indicative of the input axis torques on the gyroscopes that are fed via azimuth resolver 26 and through amplifier demodulators 27, 28 and 29 to gimbal servo motors 30, 31 and 32. Thus, the Z axis gyro 22 senses a torque tending to displace the platform 16 about the Z axis and feeds an appropriate signal to the Z axis servo motor 32 which torques the platform (by torquing gimbal 17 relative to gimbal 18) about the Z axis in a sense to diminish the Z axis torque detected by the gyro 22. Similarly, the gyros 20 and 21 detect torques tending to displace the platform 16 about the gyro input axes and, via resolver 26, feed signals indicative of the X and Y components of such torques to the X and Y servo motors 30, 31 which torque the platform in a sense to diminish the input axis torque detected by the gyros 20 and 21.

The gyros 20, 21 and 22 are each provided with conventional torquers 40, 41 and 42 which apply torques to the gyro, received from computer 15, such as to precess each gyro about its input axis at a rate sufficient to maintain a selected orientation, such as local earth level, of the platform. It is to be understood that the described stable platform and computer are merely typical of several well-known inertial autonavigators and neither the particular details of the platform nor of the computer form part of the inventive concept.

The platform 16 also mounts a pair of conventional (nonintegrating) accelerometers 43 and 44 having mutually orthogonal sensing axes directed along the X and Y axes respectively. The accelerometers produce signals $A_x$ and $A_y$ respectively proportional to sensed acceleration, in the direction of the accelerometer sensing axes, which are fed to the computer 15 which calculates position coordinates, velocity signals $V_x$ and $V_y$ and the gyro correction signals $\omega_x$, $\omega_y$ and $\omega_z$ which are fed through amplifiers 45, 46 and 47 to the respective gyro torquers 40, 41 and 42.

In the exemplary system disclosed in FIGS. 5 and 7 the platform is rotated in azimuth by precession of the gyros to maintain the X axis directed North. For this purpose the X axis gyro 20 is precessed by applying a current to its torquer 40 to effect a rate of precession which is equal to the X axis component of the absolute angular velocity of the local geographic vertical so that the X axis remains horizontal. This rate is $$\omega_x = -\frac{V_y}{a} + \Omega \cos \theta$$

where $V_y$ is the $y$ component of the vehicular velocity, $\Omega$ is earth rate of 15 degrees per hour, $\theta$ is geographic latitude and $a$ is earth radius which may be corrected if desired for the effects of ellipticity. The rate of precession of the Y axis of gyro 21 is $$\omega_y = \frac{V_x}{a}$$

where $V_x$ is the X component of vehicular velocity. This Y axis component of earth rate is zero when the Y axis is properly directed East-West. The Z axis gyro 22 is, during normal operation, precessed by applying a current to its torquer 42 such that the X axis of the stable platform maintains its initial direction. With the Y axis directed East-West the appropriate rate of azimuth precession is $$\omega_z = -\frac{V_y}{a} \tan \theta = \Omega \sin \theta$$

The operation of the system shown in FIG. 5 may be basically considered in terms of three modes of operation. The first, mode A, is designated the fast leveling and set-up mode. The second, mode B, is designated as the take-off mode in which the azimuth error is measured. The third, mode C is the azimuth correction and normal operation mode.

We shall consider first the normal navigational mode of operation (C) which occurs after alinement and while the vehicle or aircraft is in flight. Accelerometers 43 and 44 detect the horizontal components of the platform acceleration which are sent to summing amplifiers 50 and 51 (FIG. 7) of the computer 15. In order that the outputs of the amplifiers 50 and 51 be respectively the true acceleration components $\dot{V}_x$ and $\dot{V}_y$, compensating terms appearing on leads 52 and 53 are added to cancel the components of coriolis and centripetal accelerations detected by the accelerometers. Term 52 is $$(\omega_z + \Omega \sin \theta) V_y$$

and term 53 is $$-(\omega_z + \Omega \sin \theta) V_x$$

The terms $\dot{V}_x$ and $\dot{V}_y$ are integrated respectively in integrators 54 and 55 to obtain the corrected velocity components $V_x$ and $V_y$. Dividers 56 and 57 then divide $V_x$ and $V_y$ by the earth radius value, $a$, to obtain the relative angular rates $\rho_y$ and $\rho_x$ of the vehicle (local geographic vertical) over the earth. These relative angular rates are integrated to give latitude $\theta$ and longitude $\Lambda$ position coordinates according to the relations $$\theta = \int \rho_y dt$$
$$\Lambda = \int \rho_x / \cos \theta \, dt$$

Thus, $\rho_y$ is integrated in integrator 58 to obtain $\theta$ which is fed to a resolver 59. The output of the resolver 59 is $\cos \theta$ by which is divided in divider 60 the angular rate $\rho_x$ whereby the quotient when integrated in integrator 61 provides the longitude position coordinate $\Lambda$.

The latitude $\theta$ is applied to earth rate resolver 62 which provides as its ouputs the signals $\Omega \sin \theta$ and $\Omega \cos \theta$. The relative angular rate component $\rho_y$ is applied to summing amplifier 46 which applies the precession current to the torquer of the Y axis gyro 21. The relative angular rate component $\rho_x$ is applied together with the earth rate component $\Omega \cos \theta$ to summing amplifier 45 which supplies precession current to the torquer of X axis gyro 20. Thus, the stable platform is rotated about the X and Y axes to maintain the X—Y plane normal to the local geographic vertical. In this mode (mode C) the acceleration signals $\dot{V}_x$ and $\dot{V}_y$ are not applied to the integral control circuits 70 and 71 (described below) and, further, the outputs of the latter are decoupled from the amplifiers 45 and 46.

Tangent generator 72 having an input $\theta$ from the latitude coordinate integrator 58 has an output indicative of the quantity tan $\theta$ which is multiplied in multiplier 73 by $\rho_x$ to obtain the term $$\frac{V_y}{a} \tan \theta$$

It is to be understood that the conventional computer will be provided with suitable polarity inversion (not shown) to account for the necessary signal polarities. The term from multiplier 73 is applied along with the earth rate component $\Omega \sin \theta$ to the summing amplifier 47 which supplies the precession current to the torquer of Z axis gyro 22. Thus, the X axis of the stable element is maintained north.

Note that in mode C the signal from the pickoff 25 of Z axis gyro 22 is disconnected from the amplifier 47 (FIG. 5). The computer summing amplifier 74 receives the signals $$V_y \frac{\tan \theta}{a}$$

and the signal $2\Omega \sin \theta$ and generate an output signal $\omega_z + \Omega \sin \theta$ which is multiplied in multipliers 75 and 76 by the quantities $V_y$ and $V_x$ respectively to provide the compensation terms 52 and 53 mentioned above. It will be seen that the above-described inertial system is a conventional locally earth level system with a North oriented platform.

For discussion of the application of the method of alinement as applied to the above-described system, reference is made to FIGS. 1a and 5. During mode A, the set-up mode, the aircraft is in take-off position 11 at the end of the runway 12 and centered on and alined along the surveyed control line 12, the latitude $\theta$ and longitude $\lambda$ are set to the appropriate initial values by conventional means, reset mechanism 80 (FIG. 7) is actuated to maintain the $V_x$ and $V_y$ outputs of integrators 54 and 55 at zero and a manual control 81 (FIG. 5) is operated to set shafts 82 and 83, connected therewith, at a position corresponding to the true azimuth $\beta$ of the runway line.

The shaft 82 is coupled to the rotor 84 of a synchro control transformer 85 having stator coils 86 connected to the stator coils 87 of synchro generator 88. The rotor 89 of synchro generator 88 is energized from a suitable source of potential 90 and rotated in accordance with the azimuth position of the platform by means of shaft 91 which is secured to the inner-gimbal 17. Thus, in mode A the actual azimuth position of the platform relative to the aircraft is measured by the synchro generator 88 which has its stator 87 fixed to the gimbal 18. This measured azimuth position, the position of shaft 91, is transmitted to synchro control transformer 85 where it is compared with the position of manually operated shaft 82 and the difference between the two shaft positions is fed from rotor 84 through switch S-1 (in mode A position of the switch) and amplifier demodulator 29 to operate the Z axis gimbal servo 32. In this manner the platform is slaved to the airframe in a direction determined by the shaft 82. Thus, the initial platform azimuth alinement is achieved roughly but with sufficient precision to maintain the error angle $\phi$ substantially small. The major source of deviation from North of the axis $X_1$ is due to lack of alinement between the actual physical position of the aircraft itself and the runway control line which is in error a few degrees at most.

During mode A the Z axis gyro 22 is slaved to the platform by the feeding of a signal from its pickoff 25 via demodulator 92 and switch S-2 to amplifier 47 which controls the torquer 42 to cause the gyro to precess in a direction to maintain its orientation with respect to the platform.

During mode A the output shafts 93 and 94 of servo integrators 95 and 96 are maintained at zero by means of servo action. The integrators 95 and 96 respectively comprise amplifier demodulators 97, 98 driving motors 99, 100 which in turn drive tachometer generators 101, 102 and the arms 103, 104 of suitably energized storage devices such as potentiometers 105, 106. Thus, the output signals on the potentiometer arms 103 and 104 are caused to follow the velocity of the motors 99 and 100 (which are proportional to the amplifier inputs) whereby each potentiometer signal is proportional to the integral of the input to its associated amplifier. In mode A, however, the potentiometers are held at a null or zero position by means of the feedback therefrom via switches S-3 and S-4 to the amplifiers 97 and 98 respectively. For example, any deviation of the shaft 93 from zero position is sensed by a signal of appropriate polarity and magnitude to produce at the arm 103 of potentiometer 105 a signal which is fed through switch S-3 to the input of amplifier demodulator 97 where it is compared with a ground reference supplied to the amplifier through switch S-5 (in the mode A position thereof). The difference between the signals is then amplified and applied to the motor 99 to drive the shaft 93 back to zero. In the same manner, the shaft 94 is held at zero position in mode A.

With the vehicle stationary (in mode A) the signals from the accelerometers 43 and 44 are proportional to the leveling errors of the platform about the Y and X axes respectively. As indicated in FIG. 7, corrected acceleration signals at the outputs of amplifiers 50 and 51 are fed through switches S-7 and S-8 to integral control circuits 70 and 71. These integral control circuits are conventional, well-known arrangements provided for the purpose of correcting for those errors in this type of accelerometer leveling which are due to the azimuth misalinement of the platform. The circuits 70 and 71 include amplifiers 110 and 111a of predetermined gain and integrating amplifiers 112a and 113a providing a second predetermined gain having the outputs thereof combined in comparators 114 and 115 to provide the desired leveling signals. The output of control circuit 70 in mode A is applied through switch S-9 to the summing amplifier 46 to precess the Y gyro 21. It is noted that in mode A the other input to amplifier 46 is zero because the output of integrator 54 is zero in mode A. The outputs of integrators 54 and 55 have been zeroed in mode A by reset mechanism 80. By this means the stable platform is shifted about the Y axis until the X axis accelerometer 20 indicates zero tilt. If the X axis were directly North the required output of amplifier 46 to maintain the platform horizontal would be zero. However, a steady non-zero output from amplifier 46 is required to compensate the steady directional error which may exist. This required output of the amplifier 46 is provided by the action of the integrator 112a of the control circuit 70. In a similar manner the control loop consisting of Y axis accelerometer 44, amplifier 51, integral control circuit 71 including switches S-8 and S-10, amplifier 45 and X axis gyro 20 maintain the platform horizontal about the X axis. This leveling alinement, which is conventional, quickly brings the stable platform within the desired degree of leveling accuracy. The system is now ready to be placed in mode B.

In mode B the system is released to its inertial mode of operation. Reset mechanism 80 (FIG. 7) is released so that the $V_x$ and $V_y$ outputs of integrators 54 and 55 can indicate the velocity measured by the accelerometers. The inputs to integral control circuits 70 and 71 are zeroed by operation of switches S-7 and S-8. The integrators 112a and 113a of these circuits provide steady outputs which remain connected to the amplifiers 46 and 45 in order to supply the earth rate compensations which are necessary to counter the directional error of the stable platform. The slaving of the Z axis gyro 22 to the platform is disconnected by operation of switch S-2 and the synchro slaving of the platform to the manual control 81 is disconnected by operation of switch S-1. It is noted that at the time of switching to mode B the pickoff of Z axis gyro 22 is substantially nulled since it had been slaved to the platform in mode A. This prevents any sudden change in platform azimuth orientation when switching from modes A to B. The take-off run is now initiated (mode B), preferably immediately after switching to mode B.

During mode B the platform azimuth error is measured in accordance with the accelerometer outputs by the two servo integrators 95 and 96. A resolver 111 has a stator 112 connected to receive the velocity signals $V_y$ and $V_x$ which appear at the outputs of integrators 55 and 54 respectively of the computer 15. The rotor 113 of resolver 111 has been positioned to the true bearing of the external control line on the runway by the operation of manual control knob 81 and shaft 83 during mode A. Thus, the resolver 111 resolves the velocity components $V_x$ and $V_y$ into the range and lateral components $V_R$ and $V_L$ substantially along and normal to the runway control line. In mode B the components $V_R$ and $V_L$, applied via switches S–5 and S–6, are integrated by the servo integrators 95, 96 so that the position of shaft 93 indicates distance R along the runway and the position of shaft 94 indicates lateral deviation L. The tachometer servos operate in a conventional manner. For example, the control loop comprising amplifier 98, motor 100 and tachometer generator 101 causes the shaft 94 to turn at a rate proportional to the input signal $V_L$. Consequently the position of shaft 94 is a measure of the time integral of $V_L$ or lateral deviation. Th integrator 95 functions in a similar manner so that its shaft 93 and hence potentiometer arm 103 indicates the distance traveled down the runway.

The voltage on potentiometer arm 103 is applied to any suitable detection circuit such as that shown as comprising diode 114 biased by a source of potential 115 in an amount proportional to the surveyed distance between points 11 and 12a (FIG. 1a). It is to be understood that the detector is shown for purposes of exposition and may be of any suitable type well known to those skilled in the art. Thus, the detector will provide an output on lead 116 only when the measured distance R appearing on the arm 103 of potentiometer 105 is equal to or greater than the bias of source 115. The signal on lead 116 is utilized to energize relay coil 117 to switch the system from mode B into mode C when the distance down the runway as measured by the accelerometers has reached the prescribed value such as, for example, one mile. At this instant the lateral deviation indicated by shaft 94 is a direct measure of the directional error of the platform if the actual lateral deviation of the aircraft from the runway control line (or from a line parallel thereto and containing the starting point) is zero. It is at this instant in the described embodiment that all switches are operated from their mode B positions to their mode C positions.

In mode C shaft 94 which indicates the lateral deviation L is returned to its zero position by virtue of the feedback from arm 104 of storage potentiometer 106 which is applied through switch S–4 to the amplifier demodulator 98. The other input to amplifier 98 is a grounded input from switch S–6. During the period in which the shaft 94 is returned to zero thus driving motor 100 and tachometer generator 102, the output of the latter is applied via switch S–11 in the mode C position thereof and via lead 124 to the amplifier 47 to precess the Z axis gyro 22 and thereby rotate the platform in azimuth. By virtue of the use of subsequently described appropriate scaling factors in the tachometer generator output, the amplifier 47 and the torquer 42, the platform will have been rotated through the measured azimuth error angle at the time when the shaft 94 reaches its zero position.

In FIG. 6 is illustrated the operation of the integrator 96 during the initial portion of the mode C operation at which time the azimuth correction is actually achieved. The curve 120 of FIG. 6 illustrates the position of shaft 94 as a function of time during the three modes, A, B and C. Assuming a constant error angle $\phi$ and straight line of travel of the aircraft during the takeoff run the shaft position increases linearly during mode B to the value $L_s$ at the time of switching from mode B to mode C. Then, upon operation of switch S–4 to the mode C position thereof, the shaft returns to zero as indicated by curve 121.

The output of the tachometer generator 102 at the B terminal of switch S–4 is as indicated by the line 122 of FIG. 6 during mode B. Upon switching to mode C the tachometer output is rapidly reversed and returns to zero as indicated by the curve 123. The scaling factors are chosen such that the area under the line 122 is equal to the area between the curve 123 and Time axis. If the gyro 22 is torqued with a torque T and has an angular momentum H its precession (the desired angle $\phi$) is given by $$\phi = \int \frac{T}{H} dt$$

Since the area under the curve 122 is equal to the lateral distance L and this area is equal to the area above curve 123, it will be seen that the integral of the tachometer output is directly proportional to the quantity L. The scaling factors are chosen such that the integral of the tachometer output is equal to $$-\frac{KL}{R_0}$$

where K is a constant determined by the scaling factors and $R_0$ is the predetermined distance between points 11 and 12a (the bias of detector source 115 for example). Thus, since the tachometer output is applied as the gyro torque, the integral of the torque is made equal to the integral of the tachometer output which is equal to $$-\frac{KL}{R_0}$$

Thus, the gyro is precessed and the platform is rotated through an angle $\phi$ since $$\phi = \tan \phi = -\frac{KL}{R_0}$$

Therefore, when the shaft 94 reaches its zero position the platform direction under the control of the precessed Z axis gyro has now been directed to true North and the steady outputs of the integral control circuits are no longer required. Consequently, upon switching to mode C the switches S–9 and S–10 (FIG. 7) are operated to disconnect the control circuits 70 and 71 from the inputs to the amplifiers 46 and 45, respectively. The fact that the switches S–9 and S–10 are operated before the entire correction is completed is of negligible significance since the correction requires but a short period of time. If desired, however, a small amount of delay may be provided for the operation of the switches S–9 and S–10 to avoid any such error.

Figure 1B:
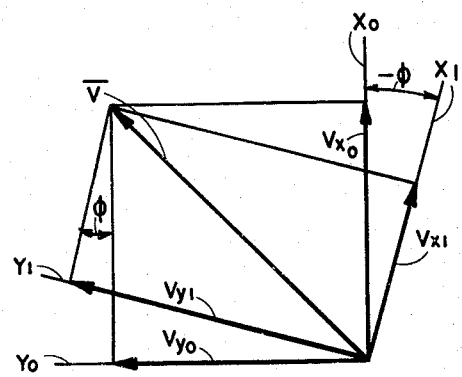

At the end of mode B, velocity components $V_x$ and $V_y$ at the outputs of integrators 54 and 55 are in error relative to the correct North and West components because of the azimuth misalinement of the platform which existed during the take-off run. These errors are indicated in FIG. 1b wherein the actual velocity components at the end of mode B are $V_{x1}$ and $V_{y1}$ respectively and differ from the true values $V_{x0}$ and $V_{y0}$ respectively by functions of the angle $\phi$. From FIG. 1b it will be seen that $$V_{y0} = V_{y1} \cos \phi - V_{x1} \sin \phi$$

whereby for the small angles of $\phi$ $V_{y0} = V_{y1} - V_{x1} \phi$. Similarly, $V_{x0} = V_{x1} + V_{y1} \phi$. Thus, it is necessary to correct the outputs of integrators 54 and 55 by the quantities $V_{y1} \phi$ and $-V_{x1} \phi$, respectively. This additional correction is achieved, as indicated in FIG. 7, by applying the alinement error signal appearing on lead 124 from the output of tachometer generator 102 to the computer summing amplifier 74 and thus to the multipliers 75 and 76 which in effect, during the period of application of the alinement error signal, multiply the quantities $V_{x1}$ and $V_{y1}$ by the angle $\phi$. At this time the system is in mode C, azimuth alinement of the system and correction of the initial velocity component errors has been completed, and the system continues to operate in conventional fashion.

The particular mode of operation of the several switches is of no great significance in the apparatus and method of this invention since it is only necessary that the several switches be operated to and from the positions and at the times indicated in the previous description. However, an exemplary mechanization of the switch operation is illustrated in FIG. 8 and may be achieved by grouping the switches in three groups with the switches of each group ganged for simultaneous operation by a relay coil operator. Thus, switches S-1, S-2, S-7 and S-8, which are normally in the A position thereof illustrated in FIG. 8, are ganged and are operated to the B, C position thereof by energization of a coil 125 which may be controlled by the actuation, manually or otherwise, of a switch 126 immediately prior to initiation of mode B, the take-off run. When the manual switch 126 is operated at the instant of switching to mode B, it is left in such position since the switches S-1, S-2, S-7 and S-8 will remain in the B, C position thereof during all subsequent operations and traverse of the navigated vehicle. The group of switches including S-9, S-10 and S-11 are normally in the illustrated de-energized A, B position thereof and hold such position during all of modes A and B. These switches are operated to the C position thereof upon energization of coil 117 from the detector 114, 115 at the instant of switching to mode C.

The third group of switches, S-3, S-4, S-5 and S-6 are normally in the A, C position thereof illustrated in FIG. 8 and hold this position during all of modes A and C since the operating coil 127 thereof is deenergized. Upon operation of switch 126 at the initiation of mode B, coil 127 is energized through normally closed switch 128 to move switches S-3 through S-6 to the B position thereof where they remain during mode B. Upon switching to mode C, the energization of coil 117 also operates switch 128 to de-energize coil 127 and allow the switches S-3 through S-6 to return to the normal unoperated positions thereof.

The computer integrators 54, 55, 58, 60, 112 and 113 may, of course, be of any conventional type and, for convenience of manufacture, may be identical with the servo integrators 95 and 96, for example. In such an arrangement the reset mechanism 80 of FIG. 7 may conveniently take the form of the zeroing feedback arrangement illustrated in connection with integrator 95 wherein the potentiometer output is fed back through a zeroing switch S-3 to the amplifier input. The zeroing switch of such reset mechanism is, of course, operated to release the zeroing of the integrators 54 and 55 upon the switching to mode B.

Figure 2:
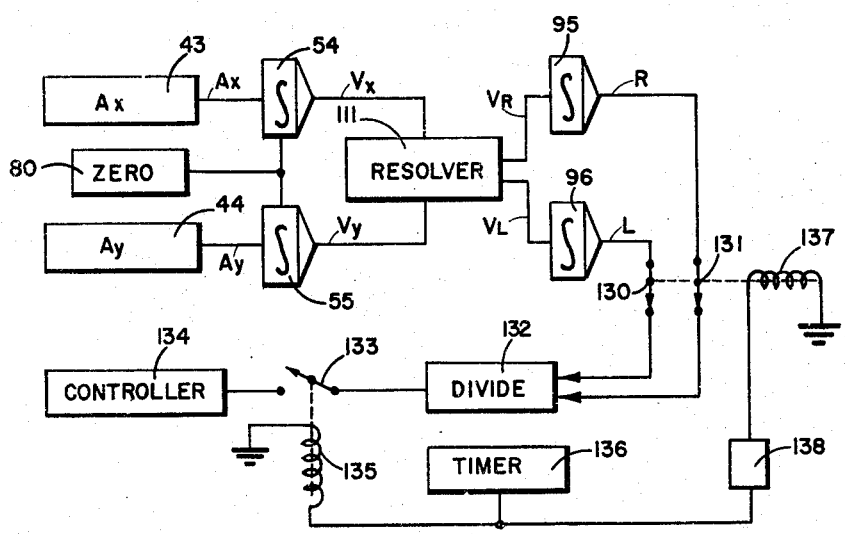
FIGS. 2, 3 and 4 are block diagrams of different embodiments of the invention illustrating different methods and apparatus for practicing the invention.

The embodiment described above is merely illustrative of one method and apparatus for deriving the alinement error $\phi$ and effecting compensation therefor. Illustrated in FIG. 2 is a somewhat different embodiment of the concept of the invention wherein the angle $\phi$ is actually computed as the quotient of $$\frac{L}{R}$$

and fed at any suitable time as the correction angle to the platform controller 134 which may be the Z axis servo motor 32 or torquer 42. Thus, the signals $A_x$ and $A_y$ from accelerometers 43 and 44 may be fed through integrators 54 and 55, zeroed during mode A by zero set device 80, to provide the signals $V_x$ and $V_y$ to resolver 111. The resolver outputs $V_R$ and $V_L$ are integrated in integrators 95 and 96 all as described in connection with FIG. 5 except that integrators 95 and 96 are not returned to zero in mode C. In the method and apparatus of this particular embodiment the aircraft may be brought back to the line 12 at any arbitrary chosen point after initiation of the take-off run provided solely that a reasonably large distance has been traversed. It is noted that in none of the embodiments described herein is it necessary to actually maintain the aircraft along the line 12 at all points during the take-off run. It is only necessary that the aircraft start from a known point and at some time thereafter sufficient for the desired accuracy of measurement (such as 40–60 seconds and a traveled distance of one mile, for example) be brought back to the line 12 and that the measurement be effected at such later time when the aircraft returns to the line. Thus, in the embodiment of FIG. 2 the quantities L and R are fed through normally closed switches 130 and 131 during mode B to a divider 132 the output of which is the angle $\phi$ which is substantially equal to $$\tan \theta = \frac{L}{R}$$

The divider output is thus a true indication of the error angle $\phi$ and may be fed through switch 133 to controller 134 at the time when the alinement correction is to be made. The time of making the correction or measurement will be controlled by closing of normally open switch 133 upon energization of a coil 135 in response to a signal from a timer 136. The signal from the timer will also energize a coil 137 to open the switches 130 and 131. If the aircraft is maintained on the line 12 during the take-off run, the timer 136 may be preset to effect the correction at any suitable time. If, on the other hand, the aircraft is allowed to deviate from the line 12 during the take-off run the timer 136 may simply be any suitable device such as a manual control which may be operated by the pilot upon return to the line 12. Any suitable means may be utilized to terminate the feeding of the signal from the divider to the controller 134. For example, a delay of a predetermined duration provided by a delay device 138 may be inserted between the timer and the coil 137 whereby the switches 130 and 131 are opened to zero the divider output after a time sufficient to achieve the correction.

Figure 3:
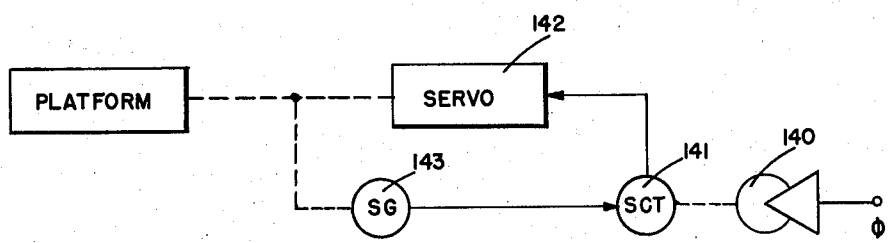

This delay may not, however, be required where the platform is accurately positioned by a conventional servo system in accordance with the exact magnitude of the computer angle $\phi$. In such an arrangement as indicated in FIG. 3 the controller 134 of FIG. 2 may comprise a servo motor 140 having a signal proportional to the angle $\phi$ as the input thereto (from divider 132 of FIG. 2, for example) and driving the rotor of a synchro control transformer 141 which has an output to platform servo motor 142. The servo 142, directly driving the platform in azimuth, may also drive a pickoff in the form of a synchro generator 143 which provides a position feedback to the servo 142 via the synchro control transformer 141. It will be recognized that this is substantially the arrangement of the structure for achieving initial azimuth orientation of the platform illustrated in FIG. 5 as comprising a platform servo 32, synchro generator 88 and the synchro transformer 85. The elements in FIG. 3 may be provided as components in addition to the similar components in FIG. 5 or alternatively, provision may be made to use the same components for the two functions of initial set-up and alinement in modes A and C, respectively.

While the above described embodiments achieve alinement of the system by computations utilizing distance functions of acceleration (distance being the second integral function of acceleration), it will readily be appreciated that the invention may be practiced by methods or apparatus utilizing acceleration or velocity quantities which are also functions of acceleration. Whether the motion or integral function of acceleration be acceleration itself, velocity or distance, the objects of the present invention may be achieved by controlling the motion of the inertial system (by controlling the motion of the aircraft) in such a manner as to substantially bring to zero the particular integral function of actual acceleration of the system in a direction normal to the external control line. Then, when this particular integral function of actual acceleration is zeroed the accelerometer signals are utilized to compute a similar function of the acceleration measured by the inertial system (as distinguished from the function of actual acceleration) in substantially the same direction. Where the motion or acceleration function is distance as in the previously described embodiments the function of actual motion is the actual displacement normal to the control line. This function is zeroed by maintaining the aircraft on the line 12 at all times or at least bringing the aircraft to the line 12 at the time of measurement so that at such time the actual function is zero. When this displacement is zero the accelerometer derived measurement of lateral displacement is made and thereby indicates the deviation of the platform from the external reference orientation.

The invention may also be practiced by utilizing acceleration signals themselves, whereby the deviation angle $\phi$ may be indicated as the measured acceleration normal to the external control line 12 at a time when the actual acceleration normal to such line is zero. Thus, at such time $$\theta = \frac{A_L}{A_R}$$

where $A_L$ is the accelerometer measured lateral component of acceleration and $A_R$ is the accelerometer measured range component of acceleration (in the directions of the lines L and R of FIG. 1a, respectively). This method would, however, be subject to the disadvantage of the difficulty of maintaining the required actual normal acceleration at zero.

Figure 4:
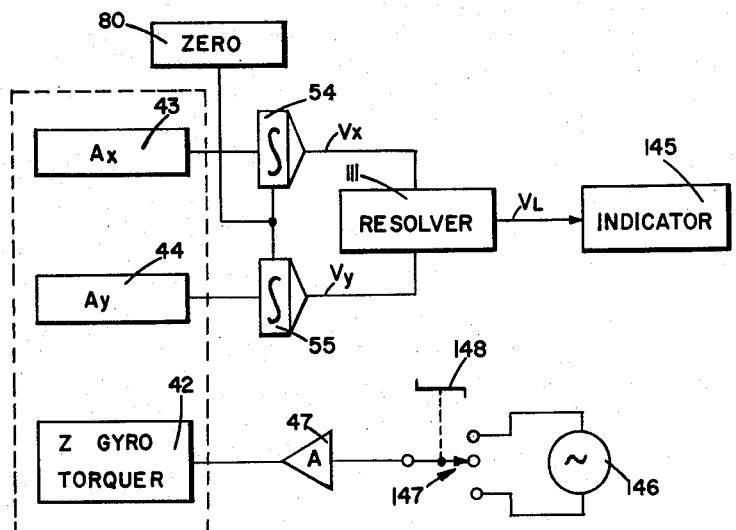

The deviation error $\phi$ may also be derived from the relation $$\theta = \frac{V_L}{V_R}$$

where $V_L$ is the accelerometer measured lateral velocity and $V_R$ is the accelerometer measured range velocity. Again, the measurement must be made at a time when the particular actual motion function normal to the external control line is zero. Thus, at the time of such a velocity measurement it is necessary that the aircraft actually be traveling along the external control line or exactly parallel thereto such that it has no lateral velocity component. This method would best be implemented by utilizing a fixed trackway to guide the aircraft in the mode B operation of the present invention. As illustrated in FIG. 4, in practicing the invention with the use of velocity signals the signals from accelerometers 43 and 44 are integrated as described above in integrators 54 and 55 to provide the velocity signals $V_x$ and $V_y$, respectively. Again the output of the integrators 54 and 55 will be zeroed in mode A by zero set mechanism 80 and thereafter released during modes B and C. The velocity signals $V_x$ and $V_y$ are resolved in resolver 111 to provide in one method of operation solely the lateral measured velocity component $V_L$ which may be fed to any suitable indicator 145. In the practice of this method the vehicle will be controlled during the mode B operation (the take-off run) to move in a straight line along or parallel to the external control line 12. This may be best achieved as previously mentioned by moving the aircraft along rails accurately alined in the direction of the external control line. If the actual lateral velocity of the aircraft is zero, the measured velocity signal $V_L$ presented on the indicator 145 is itself a measure of the deviation error angle $\phi$. Thus, it is simply necessary during such period of actual zero lateral velocity to rotate the platform in azimuth until the indicator 145 shows zero value of $V_L$.

The rotation of the platform may be achieved by any suitable means such as, for example, the feeding of a fixed signal of selected polarity to the torquer of the Z axis gyro 22. Such a signal may be derived from a source 146 through a three-position switch 147 connected to opposite sides thereof. The switch may be manually operated by a control 148 in a direction and for a time required to effect rotation of the platform so as to zero the indication on indicator 145. Thus, the operation of the switch will feed to torquer 42 of the Z axis gyro through amplifier 47 a current sufficient to achieve a precession of the gyro in a direction such as to effect rotation of the platform and drive the indicated $V_L$ signal toward zero. When the indicator 145 shows a zero or minimum value of $V_L$ the correction has been achieved.

It is to be understood that in each of the embodiments described above the mode B portion of the operation during which time the platform and accelerometer outputs are released from constraint is substantially less than the natural 84 minute period of the inertial system in order to minimize intolerable accuracies which might otherwise build up over longer periods of time. Thus, it will be seen that to practice the present invention it is only necessary to utilize the accelerometers of the inertial system to measure the motion components during a relatively short portion of vehicle travel and at the same time to maintain an actual lateral motion component, whether acceleration, velocity or distance, at zero at the end of the measuring interval.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A method for measuring the deviation angle between a line having a fixed angular relationship to an external reference line and an internal reference line of an inertial system having inertial means for generating acceleration signals indicative of acceleration of said system in a direction having a fixed angular relation to said internal reference line, comprising the steps of effecting translational motion of said system between two points which define a direction having a fixed angular relation to said external reference line and generating an output signal representing said deviation angle as a function of the acceleration signals generated during a time interval having a duration less than $$\frac{1}{2\pi}$$

times the Schuler period of said inertial system.

2. A method for measuring the deviation angle between a line having a fixed angular relationship to an external reference line and an internal reference line of an inertial system having inertial means for generating acceleration signals indicative of acceleration of said system in a direction having a fixed angular relation to said internal reference line, comprising the steps of effecting translational motion of said system between two points which define a reference direction having a fixed angular relation to said external reference line, controlling the moving of said system to zero the component of actual motion in a direction normal to said reference direction, and indicating said deviation angle as a function of the acceleration signals generated when said actual motion component is zero.

3. A method for measuring the alinement error between a line having a fixed angular relationship to an external reference line and an internal reference line of an inertial system having inertial means for generating acceleration signals indicative of acceleration of said system in a direction having a fixed angular relation to said internal reference line, comprising the steps of translationally moving said system between two points which define a direction having a fixed angular relation to said external reference line and signaling distance transverse to said direction as a function of the acceleration signals generated during a portion of said system movement having a duration considerably less than $$\frac{1}{2\pi}$$

times the Schuler period of said inertial system.

4. For use with an inertial system having inertial means for generating acceleration signals indicative of acceleration of said system in each of two mutually orthogonal directions having fixed angular relations to an internal reference line of said system, the method of measuring the angular deviation between said internal reference line and a line having a fixed angular relation to a reference line external to said system comprising the steps of translationally displacing said system between two points defining a reference direction having a fixed angular relation to said external reference line, effecting a known displacement of said system normal to said reference direction, indicating in accordance with said signals the displacement of said system in a direction normal to said reference direction, and representing the measurement of said angle as a function of said known and indicated displacements.

5. For use with an inertial system having inertial means for generating acceleration signals indicative of acceleration of said system in each of two mutually orthogonal directions having known relations to an internal reference line of said system, the method of measuring the angular deviation between said internal reference line and a line having a fixed angular relation to a reference line external to said system comprising the steps of presetting said signals, releasing said presetting, translationally displacing said system between two points defining a reference direction having a known relation to said external reference line, effecting a known displacement of said system normal to said reference direction indicating from said signals the displacement of said system in a direction normal to said external reference line, and representing said angle as a function of said known and indicated displacements.

6. The method of azimuth alining an inertial system having a pair of mutually orthogonal accelerometers comprising the steps of initially setting the outputs of said accelerometers at a selected reference value; releasing said setting of the accelerometers effecting translational motion of said system from one toward another of two points defining a selected direction, effecting a known function of acceleration of said system normal to said direction; and generating a signal from the outputs of said accelerometers representing a function of acceleration of said system in a direction normal to said selected direction.

7. The method of azimuth alining an autonavigator having a pair of mutually orthogonal accelerometers comprising the steps of setting said autonavigator in a predetermined initial position and initially setting the outputs of said accelerometers at a selected reference value; releasing said setting of the autonavigator and accelerometers, translationally moving said autonavigator between two points defining a selected direction, and zeroing actual displacement of said autonavigator normal to said direction; and generating a signal from the outputs of said accelerometers representing the displacement of said autonavigator in a direction normal to said selected direction.

8. The method of alining in azimuth an autonavigator having a natural Schuler period comprising the steps of initially setting the outputs of said autonavigator at a selected reference value; releasing said settings, effecting translational motion of said autonavigator during a time less than $$\frac{1}{2\pi}$$

times said period between two points defining a selected direction, and alining said autonavigator in accordance with the motion components measured by said autonavigator during said time.

9. For use with an inertial system having accelerometers for generating signals indicative of accelerations of said system in two mutually orthogonal directions having known relations to an internal reference line of said system: the method of indicating the actual reference angle between said internal and an external reference line comprising the steps of translationally moving said system from a first toward a second of two points defining an external control line which is displaced by a predetermined control angle from said external reference line; maintaining at zero a predetermined function of acceleration of said system in a direction normal to said external control line at a selected time; resolving predetermined functions of said acceleration signals into a signal indicative of a component of motion of said system substantially normal to said control line at said time; and indicating said actual reference angle as a function of said resolved signal component.

10. For use with an inertial system having accelerometers for generating signals indicative of accelerations of said system in two mutually orthogonal directions having known relations to an internal reference line of said system: the method of correcting the actual reference angle between said internal and an external reference line comprising the steps of translationally moving said system from a first toward a second of two points defining an external control line which is displaced by a known control angle from said external reference line; maintaining at zero the actual displacement of said system in a direction normal to said external control line at a selected time; resolving predetermined functions of said acceleration signals into a signal indicative of the accelerometer measured displacement of said system substantially normal to said control line at said time; and angularly displacing said system in accordance with said resolved displacement.

11. For use with an inertial autonavigator platform having accelerometers and means responsive to the accelerometers for controlling the level of the platform: the method of effecting initial azimuth alinement of said platform comprising the steps of initially constraining said platform in a selected orientation at a first location and clamping the outputs of said accelerometers; releasing said constraint and said clamping, and translationally moving said platform, during a time short compared to fifteen minutes, toward a second location having a known azimuth relative to said first location; obtaining the outputs of said accelerometers when said platform is at said second location generating a signal representing the component of said outputs substantially normal to said azimuth; and controlling the azimuth orientation of said platform in accordance with said normal component.

12. For use with an inertial autonavigator platform having accelerometers and means responsive to the accelerometers for controlling the level of the platform; the method of determining initial azimuth error of said platform comprising the steps of clamping the outputs of said accelerometers, releasing said clamping, and translationally moving said platform, during a time short compared to $$\frac{1}{2\pi}$$

times the Schuler period thereof, toward a second location having a known azimuth relative to said first location; obtaining the outputs of said accelerometers at a time after initiation of said movement; and indicating the azimuth alinement error of said platform from the accelerometer outputs existing at said time.

13. For use with an inertial system having a pair of accelerometers for generating signals indicative of acceleration of said system in two mutually angulated directions having known relations to an internal control line of said system, the method of determining the deviation of said line from an external control line comprising the steps of translationally moving said system from one location toward a second location which together define the direction of said external control line, controlling the motion of said system so as to substantially zero an integral function of actual acceleration thereof in a direction normal to said external control line, and indicating from said accelerometer signals said integral function of acceleration in a direction normal to said internal control line, whereby said computed function is indicative of said deviation.

14. An alinement method for an inertial system having a plurality of accelerometers comprising the steps of caging said system and presettitng the outputs of said accelerometers, releasing said caging and presetting, effecting a predetermined translational motion of said system, computing, from the outputs of said accelerometers during an initial portion of motion of said system, the system motion measured by said accelerometers, and operating said system to correct said outputs as a function of the system motion measured by said accelerometers.

15. An alinement method for an inertial system having a plurality of accelerometers comprising: the steps of presetting the outputs of said accelerometers; releasing said presetting; translationally moving said system; computing, from the outputs of said accelerometers during motion of said system, the system motion measured by said accelerometers; and correcting said outputs in accordance with said measured system motion the correcting step being performed by operating said inertial system to make its own corrections.

16. In combination with a vehicle mounted inertial system having accelerometers, releasable means for presetting said accelerometers, means responsive to said accelerometers when said releasable means are released for computing the accelerometer measured motion of said vehicle in a direction transverse to the actual motion of said vehicle, and means for utilizing said computed motion to effect azimuth alinement of said system when the actual transverse motion of said vehicle is a predetermined value.

17. An inertial system comprising an amplifier having an input, a motor connected to be driven by said amplifier, a tachometer generator and an electrical storage device each connected to be driven by said motor, means for alternatively coupling either said tachometer generator or said storage device to said amplifier input, output means coupled with said tachometer generator, a stabilized element including gyroscopic means for controlling the orientation thereof, means responsive to said output means for torquing said gyroscopic means, a plurality of accelerometers carried by said element, and computer means responsive to said accelerometers for transmitting to said amplifier input an alinement correction signal.

18. In combination, a device for storing a signal, feedback means for decreasing the value of a signal stored in said device, and means responsive to said device for generating an output signal indicative of the rate of change of said stored signal, whereby the time integral of said output signal is indicative of the initial value of said stored signal.

19. In combination with a gyro having a torquer, apparatus for effecting precession of said gyro comprising a device for storing a signal indicative of the precession to be effected, feedback means for decreasing the value of said stored signal, means for differentiating said stored signal as its value decreases, and means for applying said differentiated signal to said gyro torquer whereby the integral of the signal applied to said torquer is proportional to the initial value of said stored signal.

20. In combination with a rotatably mounted element having a gyro for controlling its orientation, apparatus for alining said element comprising accelerometers on said element, means responsive to said accelerometers for generating an error signal indicative of misalinement of said element, means for storing said signal, negative feedback means coupled with said storing means for decreasing the stored value of said signal, and means for torquing said gyro in accordance with the rate of change of said stored signal.

21. In combination with a stable platform having a plurality of accelerometers, control means for initially effecting a predetermined azimuth bearing of said platform, means responsive to said control means for resolving the outputs of said accelerometers in accordance with said bearing, and means for aligning said platform as a function of the resolved outputs of said accelerometers.

22. In combination with an aircraft having an autonavigator, means for determining the heading error in said autonavigator comprising a first means providing a signal indicating the heading deviation of motion of said aircraft from an external reference direction, a second means for comparing the heading indicated by said autonavigator with the output of said first means, and means responsive to said second means for alining said autonavigator in azimuth.

References Cited in the file of this patent

UNITED STATES PATENTS

| | | |
|---|---|---|
| 2,448,564 | Wilkerson | Sept. 7, 1948 |
| 2,752,792 | Draper et al. | July 3, 1956 |
| 2,812,485 | Schieber | Nov. 5, 1956 |
| 2,829,329 | Silva | Apr. 1, 1958 |
| 2,887,872 | Halpern et al. | May 26, 1959 |
| 2,949,026 | Grindes et al. | Aug. 16, 1960 |

OTHER REFERENCES

"Inertial Guidance," Special Report by Philip J. Klass of Aviation Week, pp. 5, 6 and 18 required, April 25, 1957. Copy in Library and Div. 10.

"Guide Missiles," Air Force Manual 52–31, Sept. 20, 1957, pp. 398, 399, 462 and 463 required. Copy in Library and Div. 10.

UNITED STATES PATENT OFFICE
CERTIFICATE OF CORRECTION

Patent No. 3,147,626 September 8, 1964

John J. Fischer et al.

It is hereby certified that error appears in the above numbered patent requiring correction and that the said Letters Patent should read as corrected below.

Column 2, line 46, for "calibraion" read -- calibration --. column 6, lines 16 and 17, in the equation, for the equal sign, second occurrence, read a plus sign; column 12, lines 17 to 20, column 13, lines 27 to 29, and lines 39 to 41, in the equations, each occurrence, for "$\theta$" read -- $\phi$ --.

Signed and sealed this 16th day of March 1965.

(SEAL)
Attest:

ERNEST W. SWIDER
Attesting Officer

EDWARD J. BRENNER
Commissioner of Patents